United States Patent
Schroers et al.

(10) Patent No.: US 10,497,100 B2
(45) Date of Patent: Dec. 3, 2019

(54) IMAGE CANCELLATION FROM VIDEO (71) Applicant: Disney Enterprises, Inc., Burbank, CA (US)

(72) Inventors: Christopher Schroers, Zürich (CH); Alexander Sorkine Hornung, Zürich (CH)

(73) Assignee: Disney Enterprises, Inc., Burbank, CA (US)

(*) Notice: Subject to any disclaimer, the term of this patent is extended or adjusted under 35 U.S.C. 154(b) by 244 days.

(21) Appl. No.: 15/796,073

(22) Filed: Oct. 27, 2017

(65) Prior Publication Data

US 2018/0268527 A1 Sep. 20, 2018

Related U.S. Application Data (60) Provisional application No. 62/472,723, filed on Mar. 17, 2017.

(51) Int. Cl.
G06T 5/00 (2006.01)
G06T 7/11 (2017.01)
G06T 5/20 (2006.01)
G06K 9/34 (2006.01)
G06K 9/00 (2006.01)
G06T 3/60 (2006.01)

(52) U.S. Cl.
CPC .............. *G06T 5/003* (2013.01); *G06K 9/346* (2013.01); *G06T 5/005* (2013.01); *G06T 5/20* (2013.01); *G06T 7/11* (2017.01); *G06K 9/00711* (2013.01); *G06K 2209/21* (2013.01); *G06T 3/60* (2013.01); *G06T 2207/10016* (2013.01); *G06T 2207/10032* (2013.01); *G06T 2207/30248* (2013.01)

(58) Field of Classification Search
None
See application file for complete search history.

(56) References Cited

U.S. PATENT DOCUMENTS 9,277,122 B1 * 3/2016 Imura ..................... G06T 7/73
9,536,335 B2 * 1/2017 Abdollahian ........... G06T 5/005
(Continued)

OTHER PUBLICATIONS

Sayer, Peter. "The Janus 360 Drone Shoots Hi-Def. All-Around Immersive Video." *IT News*, Jun. 15, 2016. pp. 1-4.
(Continued)

*Primary Examiner* — Anand P Bhatnagar
(74) *Attorney, Agent, or Firm* — Farjami & Farjami LLP (57) ABSTRACT A video processing system includes a computing platform having a hardware processor and a system memory storing an image cancellation software code. The hardware processor executes the image cancellation software code to receive a frame of video, detect an object image for cancellation from the received frame, and map the received frame from an original representation to a representation in which the object image does not intersect a frame boundary. The image cancellation software code also filters the mapped frame to remove features of the object image that appear to be in motion, inpaint the mapped and filtered frame to mask the object image, and reverse map the mapped and filtered frame having the object image masked to the original representation. The reverse mapped frame is composited with the received frame to produce an inpainted frame of video from which the object image has been cancelled.

20 Claims, 7 Drawing Sheets (56) References Cited

U.S. PATENT DOCUMENTS

| | | | | |
|---|---|---|---|---|
| 9,886,746 B2* | 2/2018 | Karande | ............... | G06T 5/005 |
| 2004/0252886 A1* | 12/2004 | Pan | ............... | G06K 9/342 |
| | | | | 382/173 |
| 2005/0129324 A1* | 6/2005 | Lemke | ............... | H04N 1/387 |
| | | | | 382/254 |
| 2011/0044514 A1* | 2/2011 | Rahmes | ............... | G06K 9/00067 |
| | | | | 382/124 |
| 2016/0073023 A1* | 3/2016 | Rondinelli | ......... | H04N 5/23238 |
| | | | | 348/36 |
| 2016/0140392 A1* | 5/2016 | Gurbuz | ............... | G06K 9/00624 |
| | | | | 382/103 |
| 2016/0275708 A1* | 9/2016 | Abdollahian | ......... | G06T 5/005 |
| 2017/0053169 A1 | 2/2017 | Cuban | | |
| 2017/0076429 A1 | 3/2017 | Russell | | |

OTHER PUBLICATIONS

"Aerial Stereoscopic 360 Video and Images for True Live-Action Virtual Reality.", .OpticalFlow... Aug. 3, 2016. Web. Apr. 26, 2017. pp. 1-10.

"Lowered Gimbal Mount to Remove Props from Video." PhatomPilots.com, Web. Apr. 26, 2017. pp. 1-10.

"Props in Video." PhatomPilots.com. Web. Apr. 26, 2017. pp. 1-10.

\* cited by examiner

IMAGE CANCELLATION FROM VIDEO

RELATED APPLICATIONS

The present application claims the benefit of and priority to a pending Provisional Patent Application Ser. No. 62/472,723, filed Mar. 17, 2017, and titled "Inpainting Method for Drone Removal from 360-degree VR Video," which is hereby incorporated fully by reference into the present application.

BACKGROUND

Advances in Virtual Reality (VR) technologies have resulted in an increased demand for the generation of panoramic and three hundred and sixty degree (360-degree) video. The generation of detailed and accurate representations of a local environment, for example, can be of value in the production of immersive VR content used in games, simulators, and other VR applications.

Especially compelling video can be obtained when a video camera is attached to a robotic vehicle, such as an aerial drone, capable of providing environmental perspectives that are unavailable to a land based camera operator. In the case of 360-degree video, however, the aerial drone or other robotic vehicle will often be present in the field of view of the video camera, which undesirably reduces the immersion of a user viewing the 360-degree video.

SUMMARY

There are provided systems and methods for performing image cancellation from video, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, advances in Virtual Reality (VR) technologies have resulted in an increased demand for the generation of panoramic and three hundred and sixty degree (360-degree) video. The generation of detailed and accurate representations of a local environment, for example, can be of value in the production of immersive VR content used in games, simulators, and other VR applications.

Especially compelling video can be obtained when a video camera is attached to a robotic vehicle, such as an aerial drone, capable of providing environmental perspectives that are unavailable to a land based camera operator. However, and as also stated above, in the case of 360-degree video, the aerial drone or other robotic vehicle will often be present in the field of view of the video camera, which undesirably reduces the immersion of a user viewing the 360-degree video.

The present application discloses systems and methods for performing image cancellation from video that advantageously enable the selective cancellation of undesired object images from a frame of video. The present image cancellation solution includes mapping a video frame from its original representation to a centered representation in which the undesired object image is shifted within the frame so as not to intersect a boundary of the frame. By filtering the mapped frame to remove features of the undesired object image that appear to be in motion, and then inpainting the mapped frame, the present solution masks the presence of the undesired object image in the frame. By reverse mapping the mapped frame having the undesired object image masked to its original representation, and then compositing the reverse mapped frame with the video frame in its original form, the present solution enables selective cancellation of the undesired object image while advantageously preserving substantially all other features of the original video frame.

Figure 1:
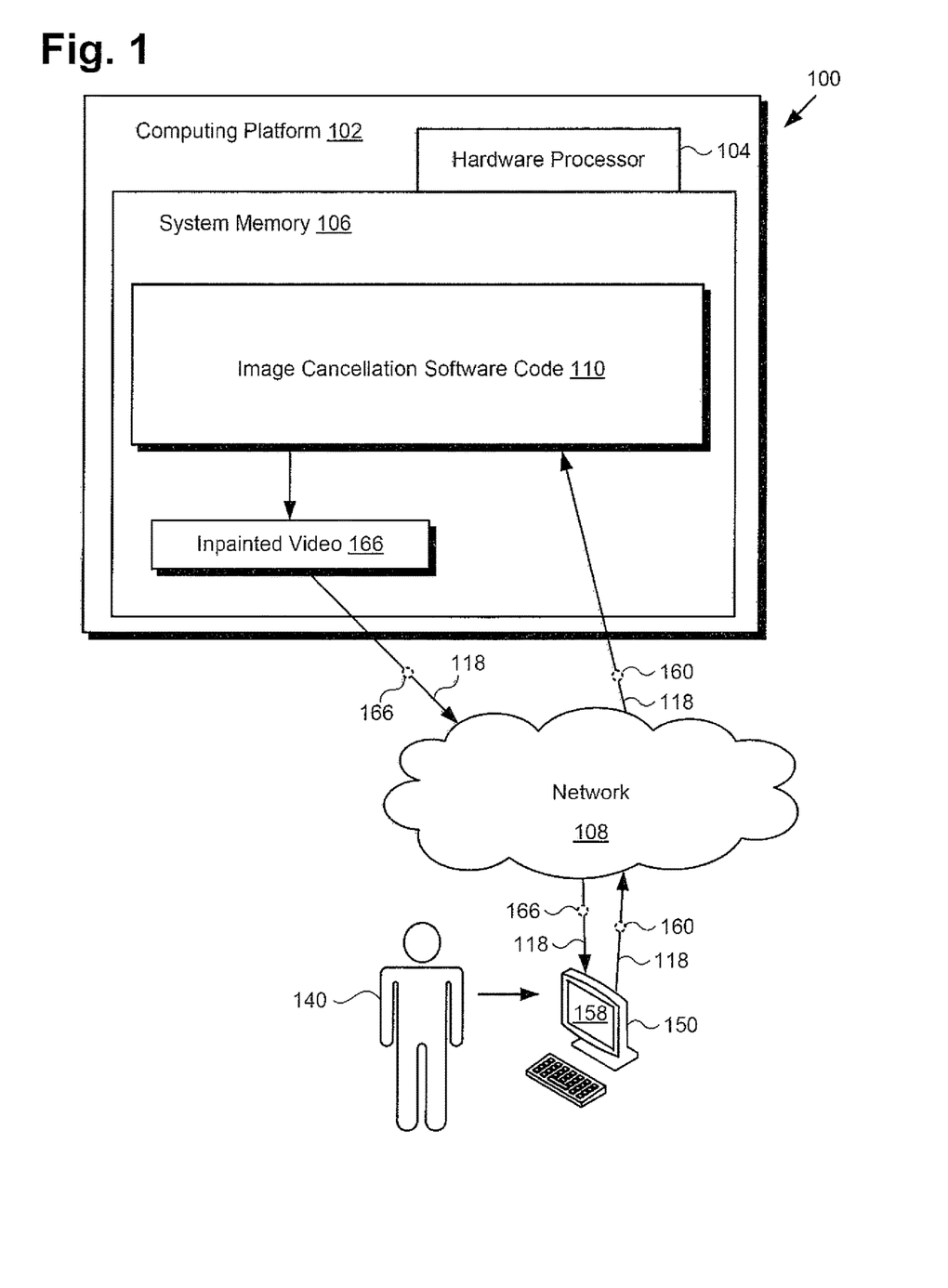
FIG. 1 shows a diagram of an exemplary video processing system for performing image cancellation from video, according to one implementation.

FIG. 1 shows a diagram of an exemplary video processing system for performing image cancellation from video, according to one implementation. As shown in FIG. 1, video processing system 100 includes computing platform 102 having hardware processor 104, and system memory 106 implemented as a non-transitory storage device. According to the present exemplary implementation, system memory 106 stores image cancellation software code 110.

As further shown in FIG. 1, video processing system 100 is implemented within a use environment including communication network 108, user device 150 including display 158, and user 140 utilizing user device 150. Also shown in FIG. 1 are network communication links 118 interactively connecting user device 150 and video processing system 100 via communication network 108, video 160, and inpainted video 166 produced using image cancellation software code 110.

It is noted that although FIG. 1 depicts image cancellation software code 110 as being stored in its entirety in memory 106, that representation is merely provided as an aid to conceptual clarity. More generally, video processing system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within video processing system 100. Thus, it is to be understood that various portions of image cancellation software code 110, such as one or more of the features described below by reference to FIG. 4, may be stored and/or executed using the distributed memory and/or processor resources of video processing system 100.

According to the implementation shown by FIG. 1, user 140 may utilize user device 150 to interact with video processing system 100 over communication network 108. In one such implementation, computing platform 102 may correspond to one or more web servers, accessible over a packet-switched network such as the Internet, for example. Alternatively, computing platform 102 may correspond to one or more computer servers supporting a local area network (LAN), or included in another type of limited distribution network.

Although user device 150 is shown as a desktop computer in FIG. 1, that representation is also provided merely as an example. More generally, user device 150 may be any suitable mobile or stationary computing device or system that implements data processing capabilities sufficient to provide a user interface, support connections to network 108, and implement the functionality ascribed to user device 150 herein. For example, in other implementations, user device 150 may take the form of a laptop computer, tablet computer, or smartphone, for example. User 140 may utilize user device 150 to interact with video processing system 100 to use image cancellation software code 110, executed by hardware processor 104, to produce inpainted video 166.

It is noted that, in various implementations, inpainted video 166, when produced using image cancellation software code 110, may be stored in system memory 106 and/or may be copied to non-volatile storage (not shown in FIG. 1). Alternatively, or in addition, as shown in FIG. 1, in some implementations, inpainted video 166 may be transmitted to user device 150 including display 158, for example by being transferred via network communication links 118 of communication network 108. It is further noted that display 158 of user device 150 may take the form of a liquid crystal display (LCD), a light-emitting diode (LED) display, an organic light-emitting diode (OLED) display, or another suitable display screen that performs a physical transformation of signals to light.

Figure 2:
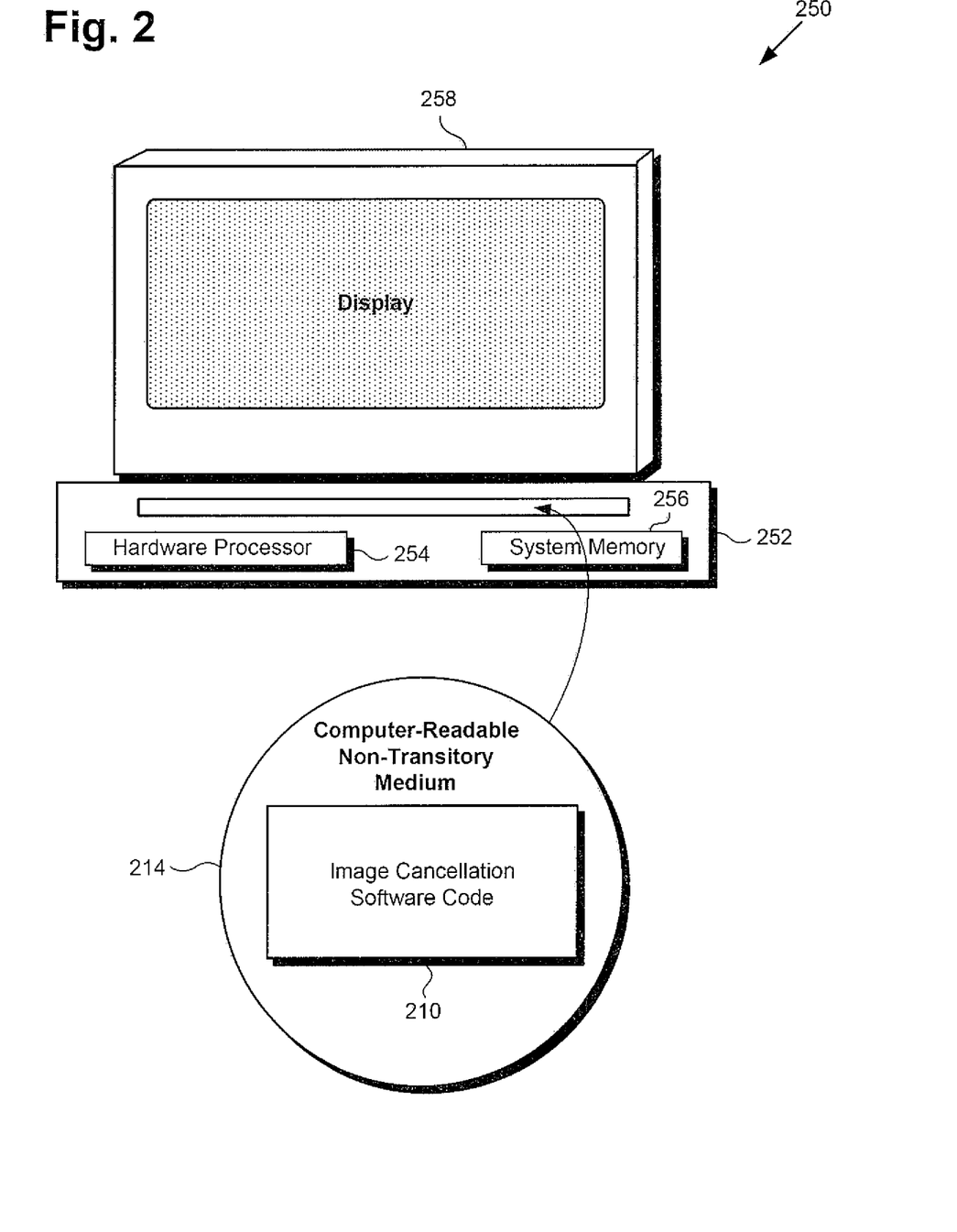
FIG. 2 shows an exemplary system and a computer-readable non-transitory medium including instructions for performing image cancellation from video, according to one implementation.

FIG. 2 shows exemplary system 250 and computer-readable non-transitory medium 214 including instructions for performing image cancellation from video, according to one implementation. System 250 includes computing platform 252 having hardware processor 254 and system memory 256, interactively linked to display 258. Display 258 may take the form of an LCD, LED display, an OLED display, or another suitable display screen that performs a physical transformation of signals to light. System 250 including computing platform 252 having hardware processor 254 and system memory 256 corresponds in general to video processing system 100 including computing platform 102 having hardware processor 104 and system memory 106, in FIG. 1. Consequently, system 250 may share any of the characteristics attributed to corresponding video processing system 100 by the present disclosure.

Also shown in FIG. 2 is computer-readable non-transitory medium 214 having image cancellation software code 210 stored thereon. The expression "computer-readable non-transitory medium," as used in the present application, refers to any medium, excluding a carrier wave or other transitory signal, that provides instructions to hardware processor 254 of computing platform 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 214 provides image cancellation software code 210 for execution by hardware processor 254 of computing platform 252. Image cancellation software code 210 corresponds in general to image cancellation software code 110, in FIG. 1, and is capable of performing all of the operations attributed to that corresponding feature by the present disclosure.

Figure 3:
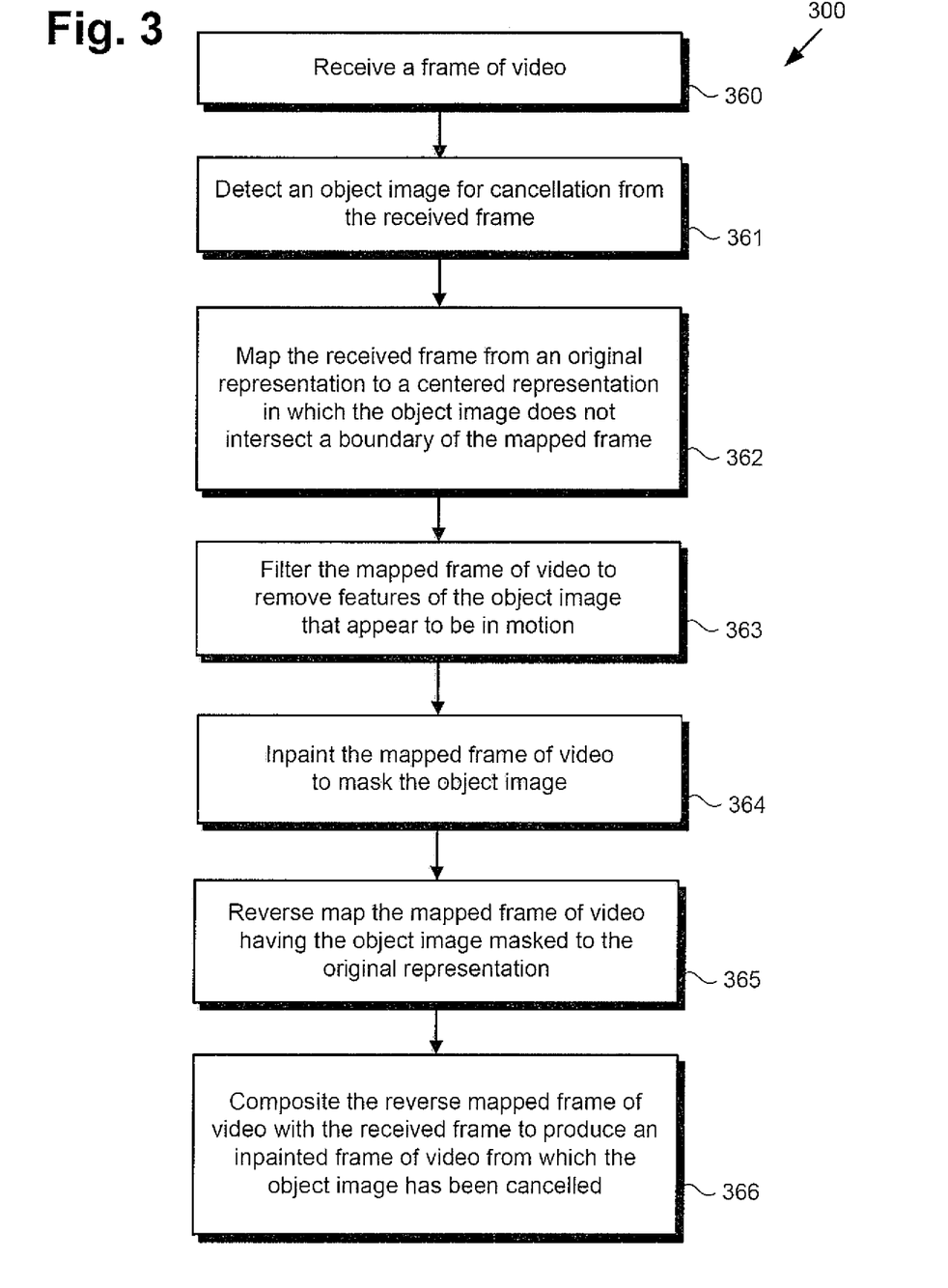
FIG. 3 shows a flowchart presenting an exemplary method for performing image cancellation from video, according to one implementation.

The functionality of image cancellation software code 110/210 will be further described by reference to FIG. 3 in combination with FIG. 4. FIG. 3 shows flowchart 300 presenting an exemplary method for use by a system, such as video processing system 100, in FIG. 1, or system 250, in FIG. 2, to perform image cancellation from video. With respect to the method outlined in FIG. 3, it is noted that certain details and features have been left out of flowchart 300 in order not to obscure the discussion of the inventive features in the present application.

Figure 4:
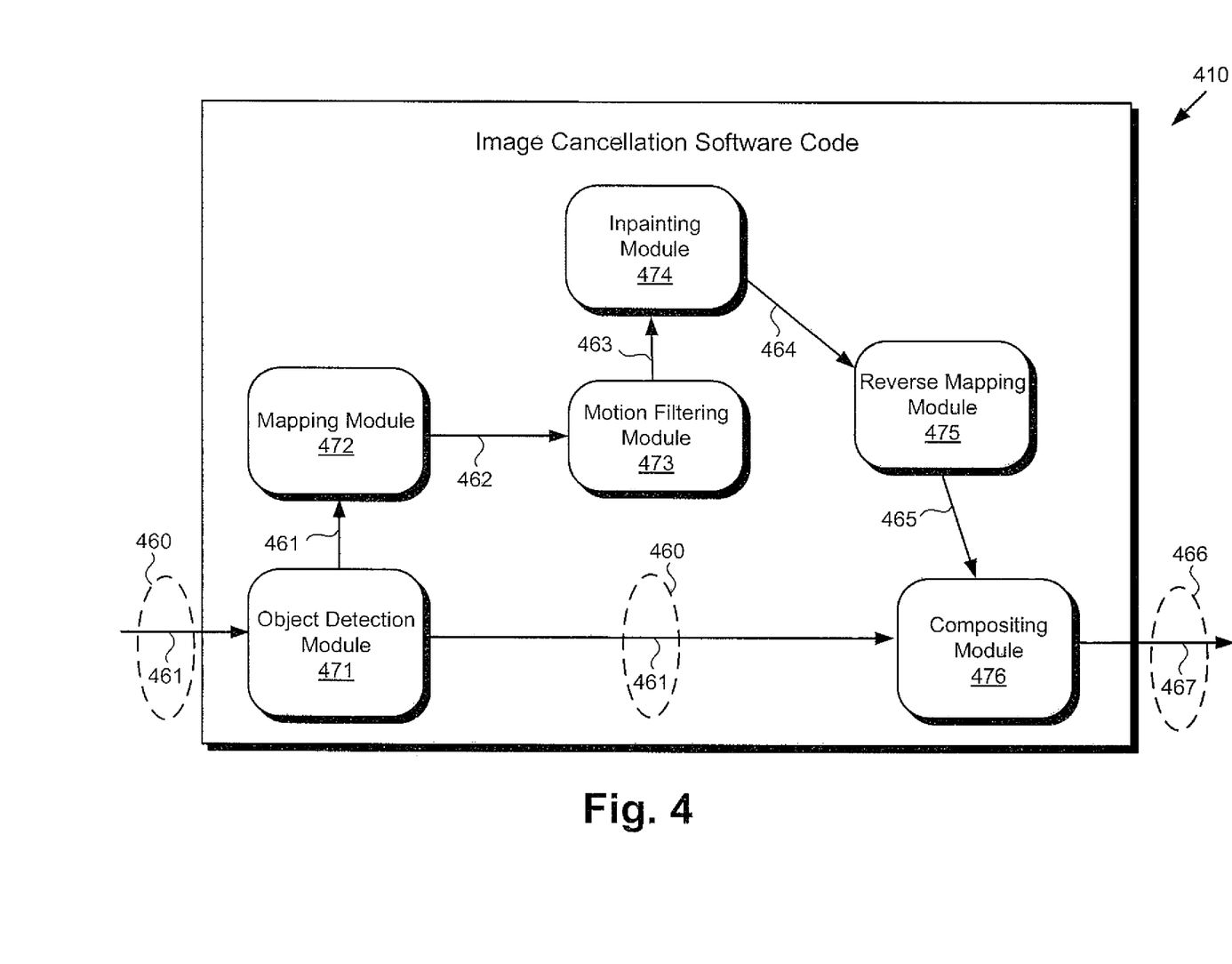
FIG. 4 shows an exemplary diagram of an image cancellation software code suitable for execution by a hardware processor of the systems shown by FIGS. 1 and 2, according to one implementation.

FIG. 4 shows exemplary image cancellation software code 410 suitable for execution by hardware processor 104/254 of the respective systems shown by FIGS. 1 and 2, according to one implementation. As shown in FIG. 4, image cancellation software code 410 may include object detection module 471, mapping module 472, motion filtering module 473, inpainting module 474, reverse mapping module 475, and compositing module 476. In addition, FIG. 4 shows video 460 including multiple frames of video in their originally received form (frames of received video represented by received frame 461), and inpainted video 466 including multiple frames of video from which an undesired object image is cancelled by being removed (inpainted frames of video represented by inpainted frame 467).

Also shown in FIG. 4 are mapped frame 462, mapped and filtered frame 463, masked frame 464, and reverse mapped frame 465. It is noted that FIG. 4 depicts image cancellation for a single frame from video 160/460, i.e., received frame 461, to produce mapped frame 462, mapped and filtered frame 463, masked frame 464, reverse mapped frame 465, and ultimately inpainted frame 467, all corresponding to received frame 461. However, it is to be understood that the video processing represented in FIG. 4 may be performed for each frame of video 160/460 that includes an object image for which cancellation is desired.

Video 460 and inpainted video 466 correspond respectively in general to video 160 and inpainted video 166, in FIG. 1, and may share any of the characteristics attributed to those corresponding features by the present disclosure. Moreover, image cancellation software code 410 corresponds in general to image cancellation software code 110/210, in FIGS. 1 and 2, and those corresponding features may share the characteristics attributed to any corresponding feature by the present disclosure. That is to say, like image cancellation software code 410, image cancellation software code 110/210 may include modules corresponding to object detection module 471, mapping module 472, motion filtering module 473, inpainting module 474, reverse mapping module 475, and compositing module 476.

Referring now to FIG. 3 in combination with FIGS. 1, 2, and 4, flowchart 300 begins with receiving frame of video 461 (action 360). By way of example, user 140 may utilize user device 150 to interact with video processing system 100, or may interact directly with system 250, in order to produce inpainted video 166/466. As shown by FIG. 1, in one implementation, user 140 may do so by transmitting video 160/460 including frame of video 461 from user device 150 to video processing system 100 via communication network 108 and network communication links 118. Alternatively, video 160/460 including frame of video 461 may be received from a third party source of video content, or may be stored in system memory 106/256. Video 160/460 including frame of video 461 may be received by image cancellation software code 110/210/410, executed by hardware processor 104/254.

Figure 5A:
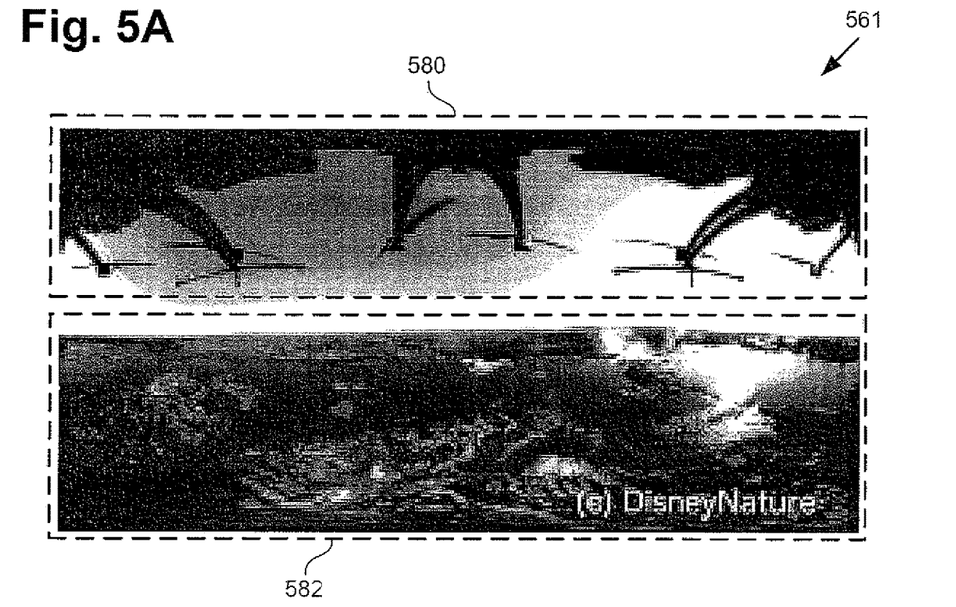
FIG. 5A shows an exemplary video frame including an object image for cancellation from the video frame, according to one implementation.

As noted above, video 160/460 includes multiple video frames corresponding to received frame of video 461. Referring to FIG. 5A, FIG. 5A shows exemplary received frame of video 561 including object image 580 for cancellation, according to one implementation. Also shown in FIG. 5A is retained image portion 582 of received frame of video 561. Received frame of video 561 corresponds in general to is received frame of video 461, in FIG. 4, and those corresponding features may share any of the characteristics attributed to either corresponding feature by the present disclosure.

As shown in FIG. 5A, received frame of video 461/561 may be a panoramic video frame. As further shown in FIG. 5A, in some implementations, received frame of video 461/561 may be a 360-degree video frame. It is noted that received frame of video 461/561 may be a frame of video captured using a single camera, or may be a frame of video produced by stitching or otherwise merging video images captured using a camera array.

Flowchart 300 continues with detecting object image 580 for cancellation from received frame of video 461/561 (action 361). As noted above, in VR applications, especially compelling video can be obtained from a video camera mounted on a robotic vehicle, such as an aerial drone. However, and as also noted above, in the case of 360-degree video, portions of the aerial drone or other robotic vehicle will often be present in the field of view of the video camera, resulting in the presence of an undesirable image in the video frames. For example, according to the exemplary implementation shown in FIG. 5A, received frame of video 461/561 is a 360-degree video frame captured by a camera or cameras carried by an aerial drone and undesirably including object image 580 of portions of the aerial drone.

It is noted that although object image 580 is depicted to include portions of an aerial drone, that representation is merely exemplary. More generally, object image 580 may correspond to any object image present in a frame of video and for which removal of the object image from the frame of video is desirable. Nevertheless, in the interest of conceptual clarity, object image 580 may be described as "aerial drone image 580" below with reference to FIG. 5A and/or subsequent FIGS. 5B, 5C, 5D, and 5E without limiting its more general characterization.

Detection of object image 580 for cancellation from received frame of video 461/561 may be performed by image cancellation software code 110/210/410, executed by hardware processor 104/254. In some implementations, the detection of object image 580 for cancellation from received frame of video 461/561 may be performed as an automated process by image cancellation software code 110/210/410, using object detection module 471. However, in other implementations, detection of object image 580 for cancellation from received frame of video 461/561 may be performed by image cancellation software code 110/210/410 based on an input from a human user, such as user 140, identifying object image 580 for cancellation.

Flowchart 300 continues with, mapping received frame of video 461/561 from an original representation, e.g., the equirectangular representation shown in FIG. 5A, to a centered representation in which object image 580 does not intersect a boundary of the mapped frame (action 362). Mapping of received frame of video 461/561 from its original representation to the centered representation in which object image 580 does not intersect a video frame boundary may be performed by image cancellation software code 110/210/410, executed by hardware processor 104/254, and using mapping module 472.

Figure 5B:
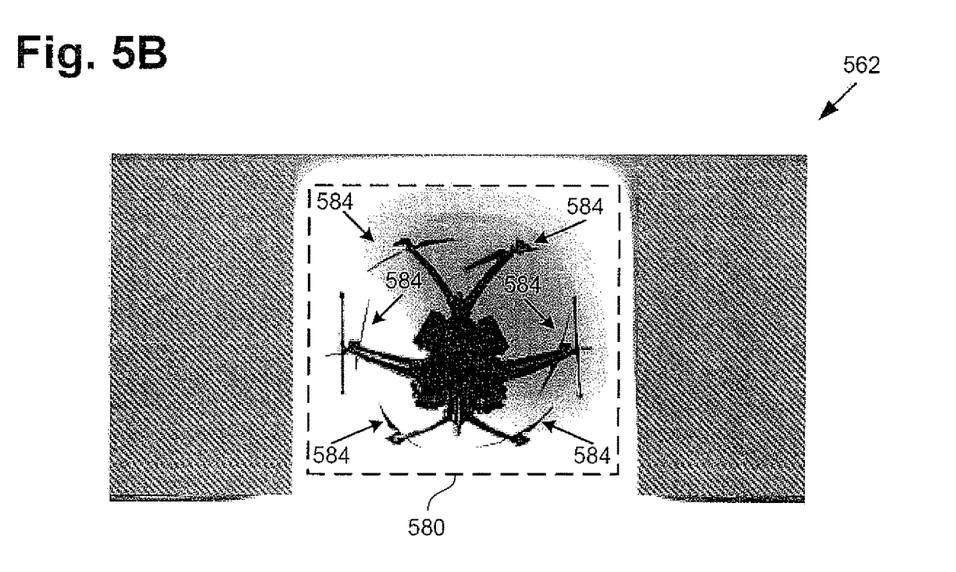
FIG. 5B shows the exemplary video frame of FIG. 5A after a mapping of the video frame to a centered representation, according to one implementation.

Referring to FIG. 5B, FIG. 5B shows exemplary received frame of video 461/561 after a mapping of the video frame to a centered representation shown as mapped frame 562, according to one implementation. Also shown in FIG. 5B are rotors 584 of aerial drone image 580, which appear to be in motion in mapped frame 562. Mapped frame 562 corresponds in general to mapped frame 462, in FIG. 4, and those corresponding features may share any of the characteristics attributed to either corresponding feature by the present disclosure.

Mapping of received frame of video 461/561 from its original representation to the centered representation shown by mapped frame 462/562 in FIG. 5B makes subsequent inpainting tasks simpler. In the absence of such mapping, image cancellation software code 110/210/410 would have to possess or acquire information about the underlying parameterization in order to respect how the frame boundaries are connected to one other.

One technique for performing the mapping of action 362 includes rendering received frame of video 461/561 into a virtual fisheye camera that points upwards in the direction of the aerial drone body and has a sufficiently large field of view. Another technique for performing the mapping of action 362 is to rotate the coordinate system underlying the equirectangular representation of received frame of to video 461/561, as shown by exemplary mapped frame 462/562 of FIG. 5B.

Flowchart 300 continues with filtering mapped frame 462/562 to remove features of object image 580 that appear to be in motion, e.g., rotors 584 of aerial drown image 580 (action 363). Filtering of mapped frame 462/562 to remove features of object image 580 that appear to be in motion may be performed by image cancellation software code 110/210/410, executed by hardware processor 104/254, and using motion filtering module 473.

Figure 5C:
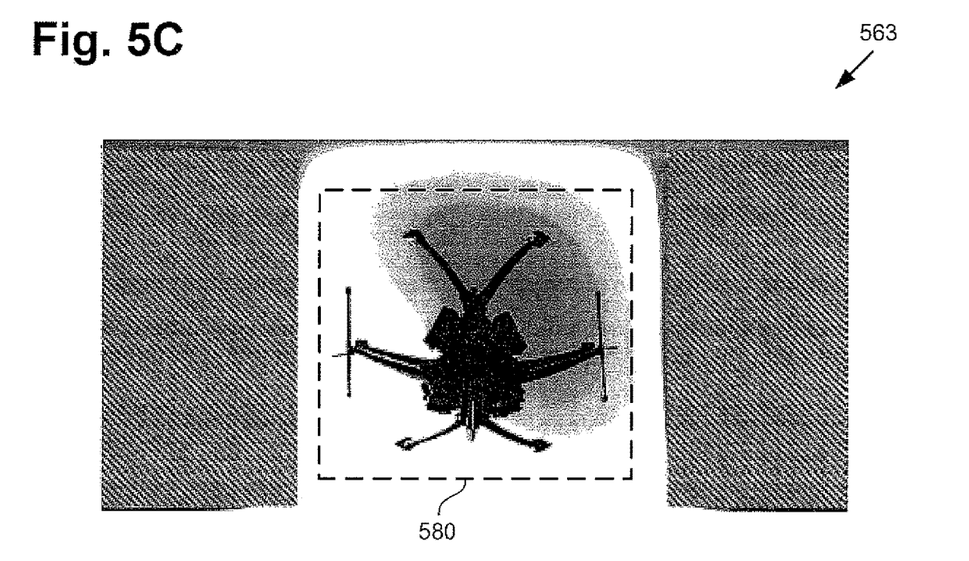
FIG. 5C shows the exemplary mapped video frame of FIG. 5B after filtering to remove features of the object image that appear to be in motion, according to one implementation.

In one exemplary implementation, a temporal median filter may be utilized that discards sample points that are determined to be too close to the color distribution present in rotors 584 before evaluating the median. FIG. 5C shows exemplary mapped and filtered frame 563, which corresponds to mapped frame 462/562 after filtering to remove rotors 584 that appear to be in motion, according to one implementation. Mapped and filtered frame 563 corresponds in general to mapped and filtered frame 463, in FIG. 4, and those corresponding features may share any of the characteristics attributed to either corresponding feature by the present disclosure.

Flowchart 300 continues with inpainting mapped and filtered frame of video 463/563 to mask object image 580 (action 364). Inpainting of mapped and filtered frame of video 463/563 to mask object image 580 may be performed by image cancellation software code 110/210/410, executed by hardware processor 104/254, and using inpainting module 474.

In implementations in which object image 580 is a rigid object fixed to the video camera or cameras capturing received frame of video 461/561, it is sufficient to have a single rough mask that segments the area occupied by object image 580. Such a mask can either be computed with common segmentation methods or may be specified by hand. It is typically not crucial to have an exact segmentation of object image 580. However, it is important to ensure that all of object image 580 is contained within the mask. As a result, it may be advantageous or desirable to perform some amount of dilation in case the mask was obtained from an automatic segmentation method.

Let the image domain be denoted by $\Omega \subset R^2$ and the mask that specifies the location of object image 580 be denoted by $K \subset \Omega$ such that object image is expected to be fully enclosed by K. A color channel of object image 580 may be expressed as $f: \Omega \to R$. Because the computation is equivalent for all color channels, the computation for only a single color channel is described herein. In that case, an inpainting problem can be phrased as computing an unknown function u that satisfies the following conditions:

$$u = f \text{ on } \Omega \setminus K \qquad (1)$$

$$\mathcal{L}u = 0 \text{ on } K \qquad (2)$$

with a suitable differential operator $\mathcal{L}$ and natural boundary conditions. Given that aerial drone image 580 is expected to occlude the sky, a differential operator $\mathcal{L} = \text{div}^2(\mathcal{H} u)$ may be selected that is well suited for creating smooth and substantially seamless fill-ins. That differential operator and the associated natural boundary conditions can be derived as the minimizer of the following energy function when using the calculus of variations:

$$E(u) = \int_\Omega \|\mathcal{H} u\|^2 dx. \qquad (3)$$

This corresponds to a thin plate spline energy, and $\mathcal{H}$ denotes the Hessian matrix. The elliptic partial differential equation (2) can then be discretised using finite differences, and the resulting system of equations can be solved using the successive overrelaxation solver with relaxation parameter $\omega = 1:8$. It is noted that a solution needs to be computed only within the masked region K, while the rest of the pixels can remain untouched over the entire optimization process.

Figure 5D:
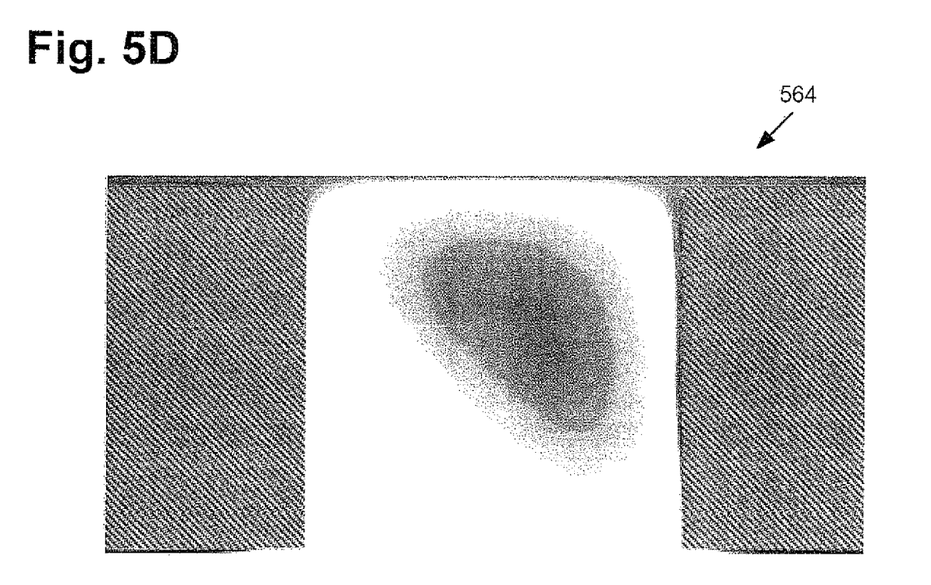
FIG. 5D shows the exemplary mapped and filtered video frame of FIG. 5C after inpainting to mask the object image, according to one implementation.

FIG. 5D shows exemplary mapped and filtered frame 463/563 after inpainting to mask object image 580, as masked frame 564, according to one implementation. Masked frame 564 corresponds in general to masked frame 464, in FIG. 4, and those corresponding features may share any of the characteristics attributed to either corresponding feature by the present disclosure.

Flowchart 300 continues with reverse mapping the mapped and filtered frame of video having the object image masked, i.e., masked frame 464/564, to the original representation (action 365). Reverse mapping of masked frame 464/564 to the original representation shown by FIG. 5A may be performed by image cancellation software code 110/210/410, executed by hardware processor 104/254, using reverse mapping module 475, and results in reverse mapped frame 465. In one implementation, for example, the reverse mapping of masked frame 464/564 may be performed through a reversal of the rotation of the coordinate system underlying the equirectangular representation of received frame of video 461/561 performed in action 362.

Flowchart 300 can conclude with compositing reverse mapped frame 465 with received frame of video 461/561 to produce inpainted frame of video 467 from which object image 580 has been cancelled (action 366). Compositing of reverse mapped frame 465 with received frame of video 461/561 to produce inpainted frame of video 467 may be performed by image cancellation software code 110/210/410, executed by hardware processor 104/254, and using compositing module 476.

Figure 5E:
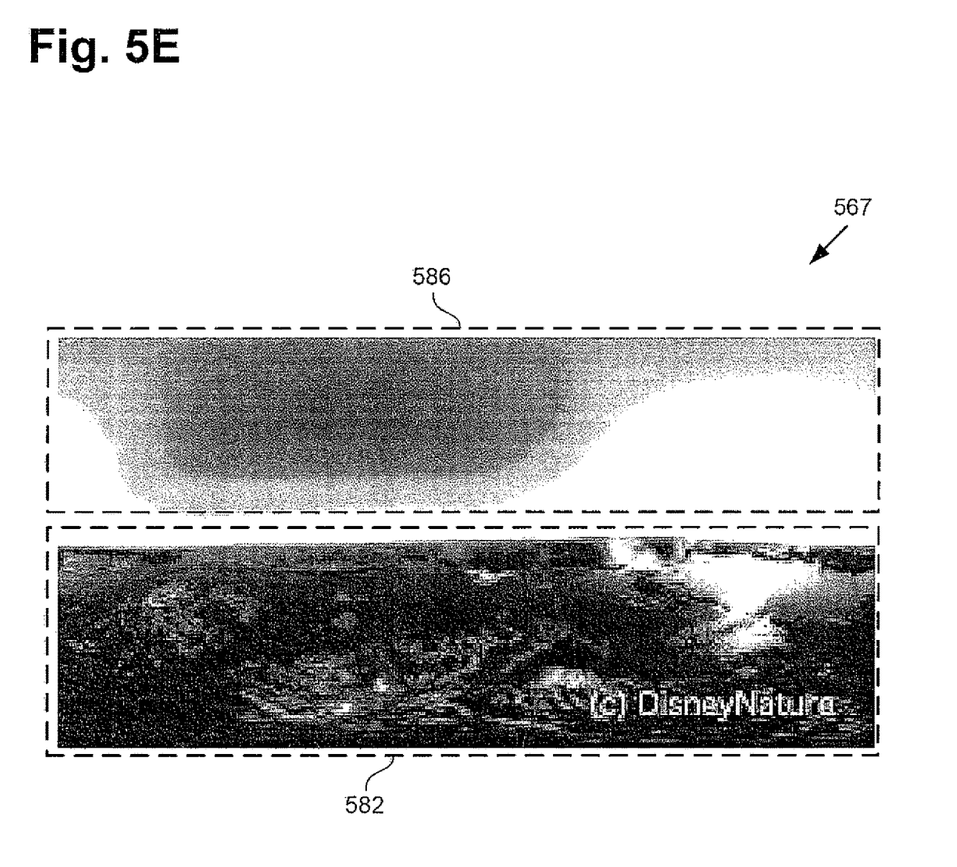
FIG. 5E shows the video frame of FIG. 5A after cancellation of the object image, according to one implementation.

Referring to FIG. 5E, FIG. 5E shows exemplary inpainted frame of video 567 from which object image 580 has been cancelled, according to one implementation. Inpainted frame of video 567 corresponds in general to inpainted frame of video 467, in FIG. 4, and those corresponding features may share any of the characteristics attributed to either corresponding feature by the present disclosure.

As shown in FIG. 5E, inpainted frame of video 467/567 includes inpainted image portion 586 from which object image 580 has been cancelled composited with retained image portion 582 of received frame of video 461/561. Compositing of inpainted image portion 586 from reverse mapped frame 465 with retained image portion 582 of received frame of video 461/561 enables selective cancellation of undesired object image 580 from inpainted frame of video 467/567 while advantageously preserving substantially all desired features of received frame of video 461/561.

Thus, the present application discloses systems and methods for performing image cancellation from video that advantageously enable the selective cancellation of undesired object images from a frame of video. The present image cancellation solution includes mapping a video frame from its original representation to a centered representation in which the undesired object image is shifted within the frame so as not to intersect a boundary of the frame. By filtering the mapped frame to remove features of the undesired object image that appear to be in motion, and then inpainting the mapped frame, the present solution masks the presence of the undesired object image in the frame. By reverse mapping the mapped frame having the undesired object image masked to its original representation, and then compositing the reverse mapped frame with the video frame in its original form, the present solution enables selective cancellation of the undesired object image while preserving substantially all other features of the original video frame.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video processing system comprising:
a computing platform including a hardware processor and a system memory;
an image cancellation software code stored in the system memory;
the hardware processor configured to execute the image cancellation software code to:
receive a frame of video;
detect an object image for cancellation from the received frame;
map the received frame from an original representation to a centered representation in which the object image does not intersect a boundary of the mapped frame;
filter the mapped frame of video to remove features of the object image that appear to be in motion;
inpaint the mapped and filtered frame of video to mask the object image;
reverse map the mapped and filtered frame of video having the object image masked to the original representation; and
composite the reverse mapped frame of video with the received frame to produce an inpainted frame of video from which the object image has been cancelled.

2. The video processing system of claim 1, wherein the frame of video is a panoramic video frame.

3. The video processing system of claim 1, wherein the frame of video is a three hundred and sixty degree (360-degree) video frame.

4. The video processing system of claim 1, wherein the object image comprises a portion of a vehicle used to capture the frame of video.

5. The video processing system of claim 1, wherein the object image comprises a portion of an aerial drone used to capture the frame of video.

6. The video processing system of claim 1, wherein mapping the received frame from the original representation to the centered representation comprises rotating an equirectangular coordinate system of the original representation.

7. The video processing system of claim 1, wherein mapping the received frame from the original representation to the centered representation comprises rendering the received frame using a virtual fisheye camera.

8. A method for use by a video processing system including a computing platform having a hardware processor and a system memory storing an image cancellation software code, the method comprising:
receiving, using the hardware processor, a frame of video;
detecting, using the hardware processor, an object image for cancellation from the received frame;
mapping, using the hardware processor, the received frame from an original representation to a centered representation in which the object image does not intersect a boundary of the mapped frame;
filtering, using the hardware processor, the mapped frame of video to remove features of the object image that appear to be in motion;
inpainting, using the hardware processor, the mapped and filtered frame of video to mask the object image;
reverse mapping, using the hardware processor, the mapped and filtered frame of video having the object image masked to the original representation; and
compositing, using the hardware processor, the reverse mapped frame of video with the received frame to produce an inpainted frame of video from which the object image has been cancelled.

9. The method of claim 8, wherein the frame of video is a panoramic video frame.

10. The method of claim 8, wherein the frame of video is a three hundred and sixty degree (360-degree) video frame.

11. The method of claim 8, wherein the object image comprises a portion of a vehicle used to capture the frame of video.

12. The method of claim 8, wherein the object image comprises a portion of an aerial drone used to capture the frame of video.

13. The method of claim 8, wherein mapping the received frame from the original representation to the centered representation comprises rotating an equirectangular coordinate system of the original representation.

14. The method of claim 8, wherein mapping the received frame from the original representation to the centered representation comprises rendering the received frame using a virtual fisheye camera.

15. A computer-readable non-transitory medium having stored thereon instructions, which when executed by a hardware processor, instantiate a method comprising:
receiving a frame of video;
detecting an object image for cancellation from the received frame;
mapping the received frame from an original representation to a centered representation in which the object image does not intersect a boundary of the mapped frame;
filtering the mapped frame of video to remove features of the object image that appear to be in motion;
inpainting the mapped and filtered frame of video to mask the object image;
reverse mapping the mapped and filtered frame of video having the object image masked to the original representation; and
compositing the reverse mapped frame of video with the received frame to is produce an inpainted frame of video from which the object image has been cancelled.

16. The computer-readable non-transitory medium of claim 15, wherein the frame of video is a panoramic video frame.

17. The computer-readable non-transitory medium of claim 15, wherein the frame of video is a three hundred and sixty degree (360-degree) video frame.

18. The computer-readable non-transitory medium of claim 15, wherein the object image comprises a portion of a vehicle used to capture the frame of video.

19. The computer-readable non-transitory medium of claim 15, wherein the object image comprises a portion of an aerial drone used to capture the frame of video.

20. The computer-readable non-transitory medium of claim 15, wherein mapping the received frame from the original representation to the centered representation comprises rotating an equirectangular coordinate system of the original representation.

* * * * *